Figure 1:
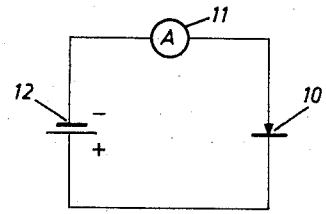

Sept. 3, 1963    A. E. R. WESTMAN ETAL    3,102,425
METHOD AND APPARATUS FOR TEMPERATURE INTEGRATING
Filed March 14, 1962    5 Sheets-Sheet 1

WILHELM W.B. SCHUMACHER
ALBERT E.R. WESTMAN
INVENTOR.

BY

Attorney

Sept. 3, 1963    A. E. R. WESTMAN ETAL    3,102,425
METHOD AND APPARATUS FOR TEMPERATURE INTEGRATING
Filed March 14, 1962    5 Sheets-Sheet 2

WILHELM W. B. SCHUMACHER
ALBERT E. R. WESTMAN
INVENTOR.

BY *Harold G. Fox*
Attorney

Sept. 3, 1963    A. E. R. WESTMAN ETAL    3,102,425
METHOD AND APPARATUS FOR TEMPERATURE INTEGRATING
Filed March 14, 1962    5 Sheets-Sheet 3

WILHELM W.B. SCHUMACHER
ALBERT E.R. WESTMAN
INVENTOR.

BY

Attorney

WILHELM W.B. SCHUMACHER
ALBERT E.R. WESTMAN
INVENTOR.

BY
Attorney 3,102,425
METHOD AND APPARATUS FOR
TEMPERATURE INTEGRATING
Albert E. R. Westman, Toronto, Ontario, and Wilhelm
W. B. Schumacher, Don Mills, Ontario, Canada,
assignors to Ontario Research Foundation, Toronto,
Ontario, Canada
Filed Mar. 14, 1962, Ser. No. 179,543
6 Claims. (Cl. 73—362)

The invention relates to methods and apparatus for temperature integrating. More particularly, this invention relates to methods and apparatus for temperature integrating which utilize the reverse current of a semiconductor junction. This invention also relates to methods and apparatus as aforementioned which may be used for the determination of the state of any temperature dependent chemical reaction following the Arrhenius law.

As is well known in the art, temperature can be measured by electrical means, and so far two devices have been widely used for this purpose. The first device is the so-called thermo-couple which consists of two dissimilar metals soldered or welded together and which is capable of producing a voltage, the voltage being a function of temperature. The other device is the so-called resistance thermometer. In this device the change of electrical resistance with temperature is utilized to measure temperature. In resistance thermometers any metal wire can be used. As is well known, metals have a positive temperature coefficient of resistance, i.e., the resistance thereof increases with an increase of temperature. However, the temperature coefficient of the resistance of metals is small. A higher temperature coefficient of resistance has been found to be characteristic of so-called semiconductor materials, for instance, carbon films, sintered oxides, as well as pure single crystals of germanium, silicon etc. which also can be used as resistance thermometers. In the case of semiconductors, the temperature coefficient of resistance is negative.

Resistance thermometers of the sintered oxide type are also known as thermistors, and they are widely used. The state of the art can be seen from the following United States patents on thermistors, mainly of the sintered oxide type: J. A. Becker 2,414,792; Yoshio Ichikawa 2,976,505; T. L. Baasch 2,966,646; J. J. Torok 2,700,720; F. R. Quinn 2,609,470; C. C. J. Addink 2,740,031; D. O. R. Lundquist 2,720,573; L. W. Gildart 2,837,618; H. Christensen et al. 2,462,162; G. W. Davis 2,405,192.

The state of the art as to other semiconductor types of resistance thermometers is also explained in many existing patents of which the following United States patents are exemplary: C. B. Collins, 2,871,330; W. C. Dunlap Jr. 2,860,218.

The large negative temperature coefficient of resistance of semiconductors can be explained briefly as follows: The number of electrons participating in the conduction of the electric current increases with temperature because more electrons become released or excited from the non-conducting valence energy level into the so-called conduction band of the semiconductor material. A detailed description and explanation can be found in any text book on the subject. It is important to note, however, that although semiconductor materials have been used to measure temperature in the past it has been the resistance change which is utilized for detecting temperature changes, and, in order to measure that resistance change, a circuit must be used allowing one to measure it on the basis of Ohm's law. The quantative relation for such a prior art type of semiconductor resistance thermometer is then given by the equation $$I = E \times \frac{1}{R} = E \times \frac{1}{A} e^{-B/T} \quad (1)$$

In this Equation 1 is the current measured, and it depends not only on the resistance R, but also on the voltage E which is applied to the measuring device. The dependence of resistance R on temperature is given by the term $$\frac{e^{B/T}}{A}$$

where T is the absolute temperature and A and B are co-efficients, the value of which depends upon the material used. The temperature coefficient of resistance is mainly determined by the constant B of the above equation. The same equation holds true for that type of resistor known as a thermistor.

Although the temperature coefficient of resistance of semiconductor devices is generally higher than the coefficient of metals, there exists generally a great need for electronic thermometers with even higher temperature coefficients, because the higher the coefficient, the easier and the more accurate will be the measurement of temperature. The limitations of devices having low temperature coefficients of resistance or, in other words, low B values becomes especially noticeable in connection with a temperature sensitive device which we have designed and which may be called on Arrhenius integrator, the latter being more fully described hereinafter. Another disadvantage of all the resistance types of thermometer elements is the fact that the supply voltage for the measuring bridge, the voltage E in Equation 1 has to be stabilized and maintained constant.

One object of our invention is to provide methods and apparatus for temperature integrating.

Yet another object of our invention is to provide suitable methods and apparatus for determining the state at any time of a temperature dependent chemical reaction following the Arrhenius law.

Methods and apparatus embodying our invention do not rely on a change in resistance of the temperature sensitive element, as is the case with prior art types of semiconductor temperature detectors. In our new temperature integrating devices we make use of the well known reverse current of a semiconductor junction which has so far only been considered a nuisance by the users of semiconductor devices. While it has been known for some time that semiconductor junctions are temperature sensitive, this knowledge has not been utilized. Such junctions may be in the form of a so-called barrier layer, as used in certain diode rectifiers, or in the form of a P-type semiconductor region adjacent to a so-called N-type semiconductor region. Such junctions are widely used in rectifier diodes, as well as in transistors of the junction and point contact type. Any such junction has a direction in which the current flows easily, and a reverse direction in which hardly any current flows at all, assuming, of course, that certain voltage is applied to the semiconductor device. In the general uses and applications of these junction devices the reverse current, sometimes called leakage current, is thoroughly unwanted, and in the design of these devices it has been attempted to keep it as small as possible. It is usually orders of magnitude smaller than the normal forward current or operating current. This might possibly explain why there is no disclosure in the prior art that this reverse current can be used as an indicator of temperature. For example, in the three volumes entitled "Temperature, its Measurement and Control in Science and Industry," Symposium Transactions of 1939/54/61, Reinhold Publishing Company, New York, there is no mention of any semiconductor junction device, although many resistance type thermometers are discussed at length.

It has been found that the reverse current of a semiconductor junction device can be used as an indicator of temperature, because this current changes with temperature. Advantageously, however, this reverse current changes only very slightly with the applied voltage, which is usually called the reverse bias voltage. This phenomenon can be explained by the fact that the reverse current is a saturation current which is due to diffusion only, that is diffusion of electrons or holes through the depleted barrier region of the PN-junction. It is sometimes called minority carrier diffusion current. Since any diffusion process depends upon the temperature, it follows that the reverse current follows an exponential temperature law. It has been discovered that this reverse current of a diode junction or, similarly, of a transistor junction, can be used for the measurement of temperature, and that it has several advantages over so-called resistance thermometers, namely, it is not sensitive to variations in the supply voltage, and a very wide range of temperatures can be covered. Since the temperature coefficient of junction devices is higher than in the case of resistance thermometers, the former devices are more sensitive and can be effectively used in an Arrhenius integrator circuit.

Figure 2:
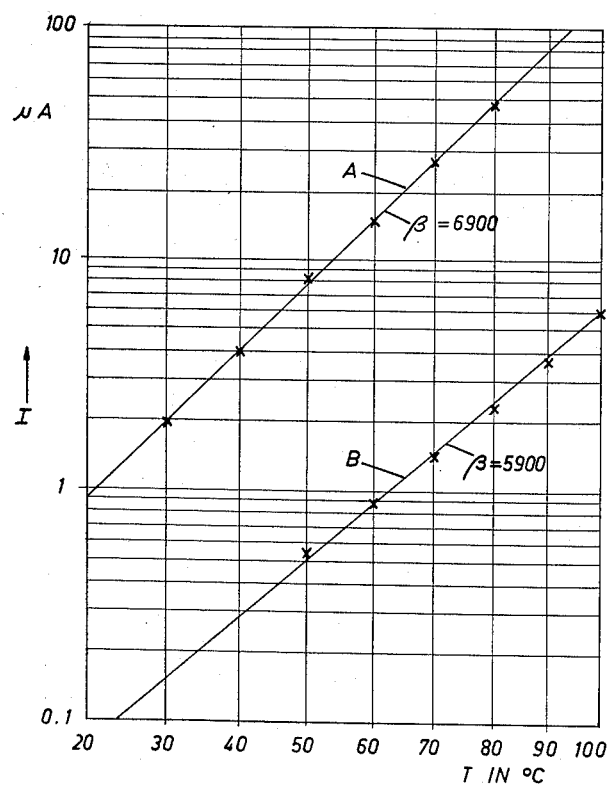
Figure 7:
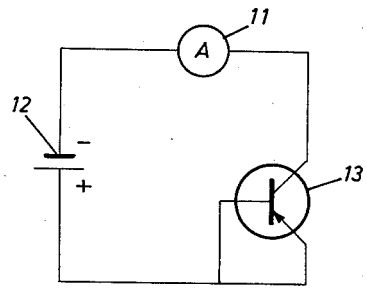
Figure 8:
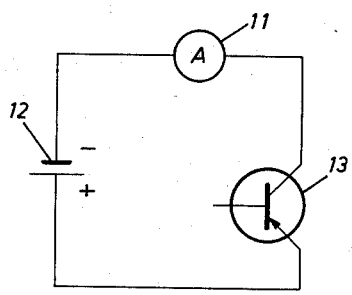
Figure 9:
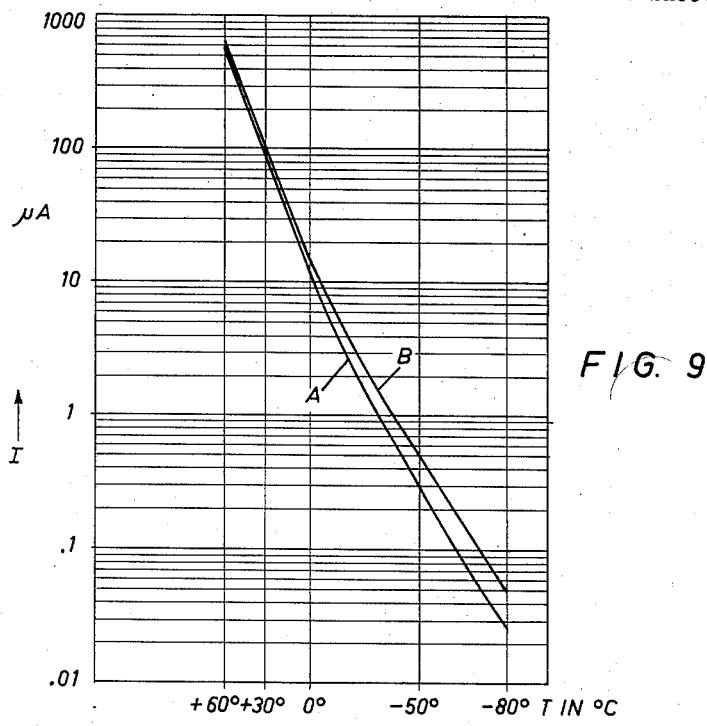
Figure 10:
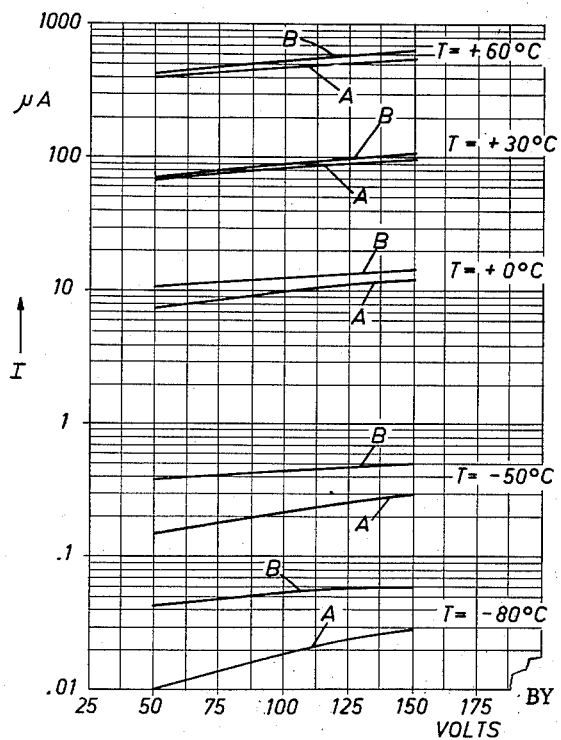
Figure 11:
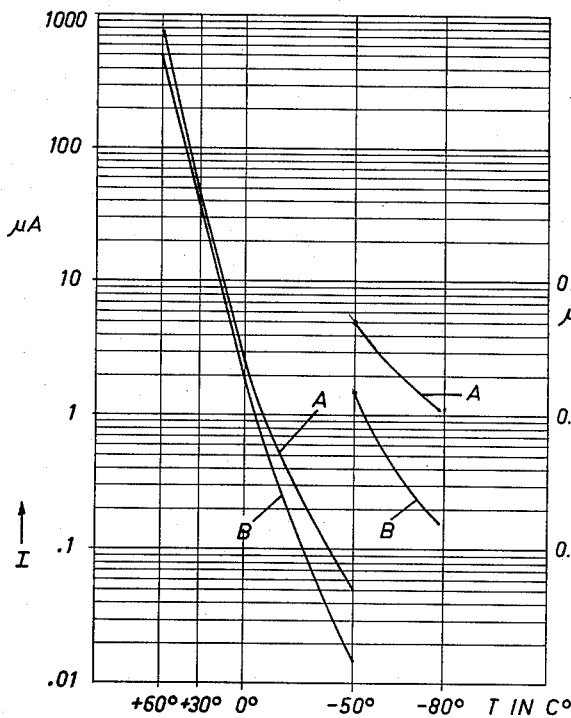
Figure 12:
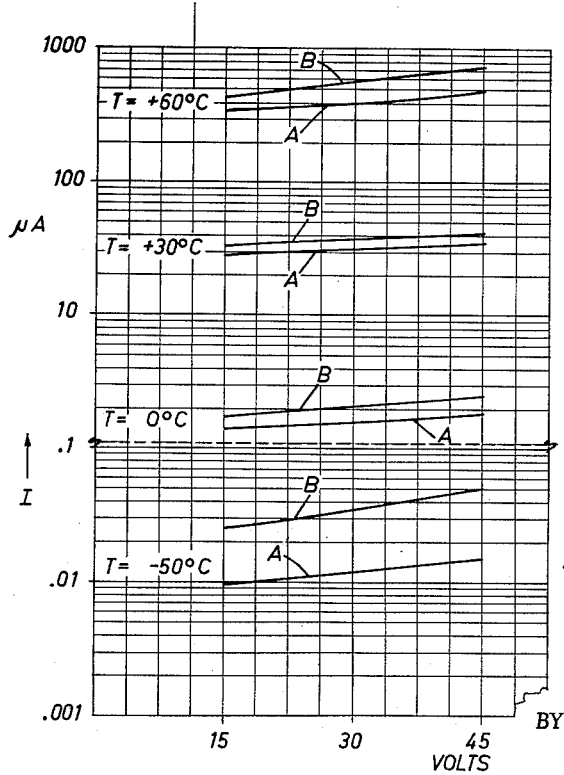
Figure 13:
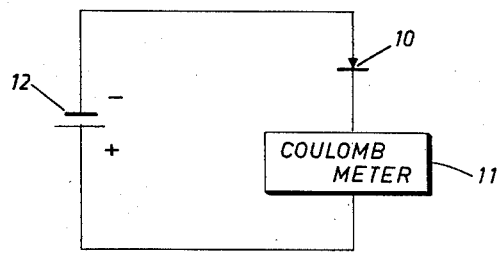
Figure 14:
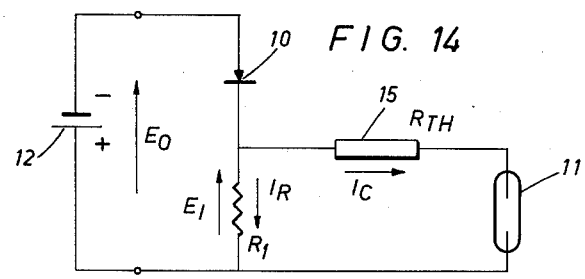
Figure 15:
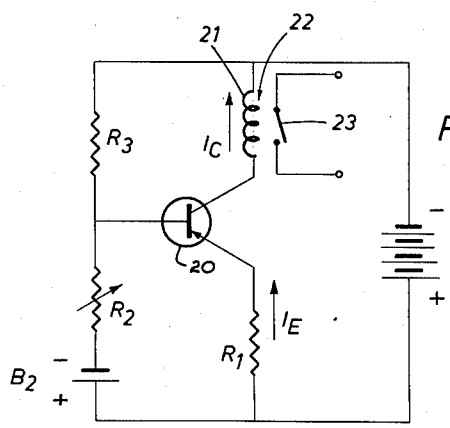

Our invention will become more apparent from a consideration of the following detailed disclosure taken in conjunction with the appended drawings, in which:

FIGURE 1 shows one embodiment of temperature measuring apparatus using semiconductors, FIGURE 2 is a graph of current vs. temperature on which are plotted two curves derived from the apparatus shown in FIGURE 1, FIGURES 3 to 8 inclusive depict modifications of the circuit shown in FIGURE 1, FIGURE 9 is a graph of current vs. temperature on which are curves showing the reverse current as a function of temperature of two commercial diodes type IN92, FIGURE 10 is a graph of current vs. voltage showing the effect of different voltages on the reverse currents of the above diodes at different temperatures, FIGURES 11 and 12 are the same as FIGURES 9 and 10 respectively but are drawn for a 2N44 transistor, FIGURE 13 depicts an embodiment of our invention, FIGURE 14 shows an Arrhenius integrator circuit embodying our invention, and FIGURE 15 shows a trigger circuit.

Referring now to FIGURE 1, there is shown a germanium diode 10, a current measuring device 11 and a battery 12 connected together in series circuit. It should be noted that the junction of diode 10 is reverse biased by battery 12 sufficiently that the saturation value of reverse current flows in the circuit. The reverse current passing through the circuit, as measured by device 11, and as a function of the temperature of the diode junction, and consequently of the temperature to which diode 10 is exposed, is plotted in curve A of FIGURE 2, FIGURE 2 being regular in intervals of $$\frac{1}{T}$$

along the abscissa, which shows temperature in degrees centigrade, and logarithmic along the ordinate, which shows reverse current in micro-amperes. When diode 10 in FIGURE 1 was replaced by a silicon diode, curve B was plotted. The germanium diode was a commercial IN48 diode operating at an inverse voltage of 5 volts. The silicon diode was a commercial silicon rectifier rated for 150 milliamps. The applied inverse voltage was 100 volts.

The law giving the reverse current as a function of temperature can be written as follows:

$$I = Ce^{-\beta/T} \quad (2)$$

For curve A $\beta$ is 6900, and for curve B $\beta$ is 5900.

Figure 3:
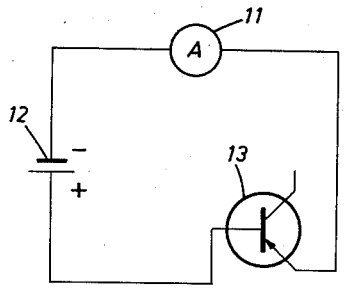
Figure 4:
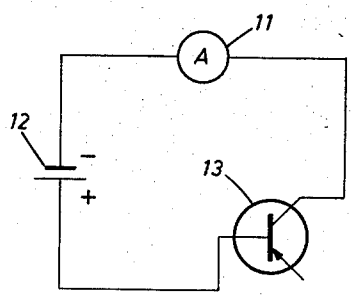
Figure 5:
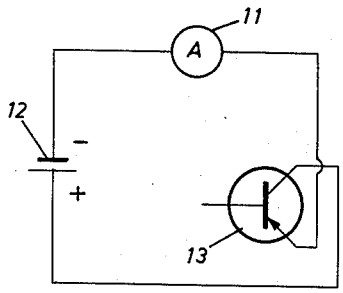
Figure 6:
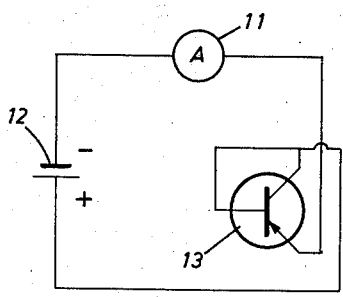

Other circuits for temperature measurement and employing transistors are shown in FIGURES 3 to 8 inclusive. Each of these figures show a battery 12, a current measuring device 11 and a PNP junction transistor 13 connected in series circuit. In FIGURE 3 the base and emitter electrodes are connected in the circuit. In FIGURE 4 the collector and base electrodes are connected in the circuit. In FIGURES 5 and 8 the collector and emitter electrodes are utilized. In FIGURE 6 the collector and base electrodes are shorted and both are used together with the emitter electrode. In FIGURE 7 the emitter and base electrodes are shorted and both are used together with the collector electrode. In all cases there is a reverse biased junction in the circuit, the junction being biased sufficiently that the saturation value of reverse current flows. Equation 2 is applicable to the circuits of FIGURES 3 to 8 as well as to the circuit of FIGURE 1. Typical measured values for the constant $\beta$ in Equation 2 are given below in Table I.

*Table I*

| Component | (° K.) | (° K.) |
|---|---|---|
| Silicon diode | 6,000 (1) | |
| Germanium diode | 7,000 (1) | |
| Germanium transistor (reverse current) | 6,100 (3) | 7,200 (4) |
| Do | 7,800 (5) | 8,300 (6) |
| Germanium transistor (leakage current) | 9,300 (7) | 10,900 (8) |

In Table I the numbers in brackets following the value of $\beta$ indicate the figure number of the circuit in which $\beta$ was measured. By way of comparison, it was found that $\beta$ values for two different carboloy thermistors were 3500 and 4000 respectively.

Referring now to FIGURE 9, there is shown curves A and B of two different commercial germanium diodes type IN92 connected as shown in FIGURE 1 and with a reverse bias of 150 volts, the curves being plotted on the same type of graph, as shown in FIGURE 2. Similar curves A and B are shown in FIGURE 11 for two different commercial transistors type 2N44 connected according to the circuit diagram of FIGURE 7 and with a reverse voltage of 45 volts. It will be seen from a consideration of FIGURES 9 and 11 that the exponential law of Equation 2 is not exactly fulfilled by these commercial units, especially at lower temperatures where the curves are slightly bent. This defect can be attributed to leakage current along the surface of the semiconductors and to various other defects, but in a semiconductor junction device especially designed and built for temperature sensing one can aim at achieving a better linearity. In any event, even if Equation 2 does not hold precisely true for any semiconductor junction device, this device may still be used for temperature sensing by the simple expedient of preparing a calibration curve for the device as shown in any of FIGURES 2, 9 or 11.

In FIGURE 10 there is shown various curves A and B on a graph of reverse current in microamperes plotted against reverse voltage in volts. The curves shown are for the two diodes type IN92 used in obtaining curves A and B in FIGURE 9, each set of curves being obtained at a different temperature. FIGURE 12 shows similar sets of curves for the two 2N44 transistors used to obtain curves A and B in FIGURE 11. It will be noted that in most cases a change in reverse voltage of 300% will cause a change in reverse current of not more than 3%. Since in practice even an unstabilized voltage supply will not change more than ±10%, the influence of supply voltage changes obviously can be neglected, and no carefully regulated and expensive power supply is required. It can be clearly seen from the foregoing that the changes in reverse current of a semiconductor junction device is a function of temperature only.

In measuring temperature using the circuits hereinbefore discussed a semiconductor junction is reverse biased sufficiently to permit the saturation value of reverse current to flow, the reverse current flowing is measured, and the temperature is determined from the known relationship between temperature and the magnitude of the reverse current. This latter step may employ the solution of Equation 2, or the temperature may be read directly from a previously prepared calibration curve for the semiconductor device such as is shown in FIGURE 2. This method is claimed in copending application Serial No. 179,618, filed Mar. 14, 1962, for Methods and Apparatus for Temperature Sensing, now abandoned.

Any one of the previously discussed circuits can be used for general thermometry. In addition any of the hereinbefore described devices may be used in connection with a radiation pyrometer. This is a device in which radiation is focused by mirrors etc. on a temperature sensitive detector. The use of any one of the aforementioned temperature sensitive semiconductor junction devices is particularly advantageous because these junctions can be made very small, especially as regards having a very small overall mass. For instance such junctions can be incorporated in thin evaporated layers of the material. The area and mass of a point contact diode or transistor which also can be employed is also very small. Due to the especially high temperature coefficient of these devices, as seen in Table I, increased sensitivity for these radiation detectors is achieved.

A particular application of the semiconductor junction device for temperature measurements embodying our invention is shown in FIGURE 13 in which a diode 10 is connected in circuit with a battery 12 and a coulomb-meter 11 or any other suitable electronic current integrator, the latter measuring the total electric charge which has passed through the circuit. The charge indicated by this coulomb-meter is given by the equation:

$$Q_i = \int_{t=0}^{t=t_i} I dt = \int C e^{-\frac{\beta}{T(t)}} dt \qquad (3)$$

where:

$Q_i$ = charge, $I$ = current, C and $\beta$ are as in Equation 2,
$T$ = absolute temperature, $t$ = time, and $t_i$ = time of reading the charge $Q_i$ from the coulomb-meter.

The charge $Q_i$ obviously depends upon the time period over which the current has flown and the temperature during this time, the latter of which determines the amount of current flow at each instant. This is exactly analogous to what we find in a temperature dependent chemical reaction. These reactions follow the well known Arrhenius law given by the equation $$\ln \frac{Co}{C} = P_i = \int_{t=0}^{t=t_i} A' e^{-\frac{B'}{T(t)}} dt \qquad (4)$$

where:

C = concentration of any one component taking part in the chemical reaction; A' and B' are reaction constants.
$P_i$ is the logarithmic change of concentration and an analogue to $Q_i$ of Equation 3.

The reaction constant B' is related to the activation energy of the reaction, is measured in temperature units, e.g. degrees absolute (° K.) and is widely different for different reactions. Typical values for B' for electrical insulation materials subjected to thermal degradation or aging are given in Table II.

*Table II*

| Type of material: | B' values of Equation 4 in ° K. |
|---|---|
| Polyvinyl | 9,000 |
| Epoxy | 9,000 |
| Epoxyde-polyester | 10,700 |
| Polyester | 13,000 |
| Polyamide | 8,700 |
| Acrylic | 10,800 |
| Silicon mod. polyester | 17,000 |

It can be seen by a comparison of Tables I and II and the previously noted values of $\beta$ for thermistors that only the semiconductor junction devices have a $\beta$ value which is of the same magnitude as the B' values for the chemical reactions. The $\beta$ values for the thermistors are much lower. Hence an analogue circuit according to FIGURE 13 for the above mentioned thermal degradation reactions could not operate without the new temperature sensing devices which have been discovered. Of course, for other chemical reactions an analogue circuit with thermistor may suffice but would require a stabilized supply voltage.

It will be seen from the foregoing that by utilization of the circuit shown in FIGURE 13 embodying our invention it is possible to determine the state at any time of a temperature dependent chemical reaction following the Arrhenius law. The method consists of placing a semiconductor junction in a position to sense the temperature of a composition of matter subject to a temperature dependent chemical reaction following the Arrhenius law, reverse biasing the semiconductor junction to a point where the saturation value of reverse current flows through the junction, measuring the total electrical charge passing through the semiconductor junction over any time interval $t_i$ and by means of electronic current integrator 11, and subsequently determining the state of the reaction at time $t_i$ from the known relationship between the charge and the state of the reaction.

Of course this method is dependent upon $\beta$ in Equation 2 and B in Equation 4 being equal. Any of the circuits of FIGURES 1 to 8 may be used in practising this method by using an electronic current integrator instead of a meter which reads current flowing in the circuit at any time.

Such a method is particularly suitable, for example, for determining when electrical insulation which is subject to thermal degradation should be replaced. Thus this method may be employed to determine when transformer, motor or generator insulation should be replaced, or, in other words, to determine the age of such insulation. In order to carry out the last step of the method a curve similar to either curve A or B in FIGURE 2 but plotted in terms of state of the reaction vs. charge Q will be provided, this curve being obtained experimentally.

It can be seen from Table I that using various modes of connecting the transistor junction devices allows one to select $\beta$ values which come as close to the B' values as possible. Yet it is still not possible with previously mentioned circuits to match the B' value of the degradation reaction of silicon modified polyester insulators which is given as 17000° K. in Table II. However, use can be made of certain circuits which themselves are well known in the art of analogue computer circuitry, especially so-called power-law circuits, which, at their output, give a voltage proportional to the square of the input voltage, or to the 1.5 power of the input current etc. However, we have discovered even a simpler way to modify the exponential response characteristic of a temperature sensing device using either two thermistors or a semiconductor junction sensor in combination with a thermistor. FIGURE 14 gives an example. In FIGURE 14 we have shown a semiconductor junction device 10 connected in series circuit with a battery 12 and a resistor $R_1$. Resistor $R_1$ may be any kind of resistor kept at a constant temperature. Alternatively, resistor $R_1$ need not be kept at a constant temperature, if it is a resistor made of a material such as constantan or manganin, the resistance of such resistors being independent of ambient temperature and the magnitude of the current passing therethrough. Where herein we use the term "constant resistor" we mean any resistor kept at a constant temperature or a resistor made of constantan, manganin or the like. Connected across the resistor R is a thermistor 15 and a coulomb-meter 11. Of course, any other type of electronic current integrator could be used in place of coulomb-meter 11. Device 10 will determine the current $I_1$ as a function of temperature only, regardless of fluctuations in the supply voltage E. $I_1$ will be divided into a current $I_R$ flowing through the resistor $R_1$ and a current $I_c$ flowing through thermistor 15 and coulomb-meter 11. Since $I_1$ varies with temperature, $E_1$, the effective voltage on the thermistor, varies with temperature as well. In addition, the resistance $R_{TH}$ of the thermistor varies with temperature. In detail we find $$I_c = \frac{R_1}{R_{TH}+R_1} I_1 \quad (5)$$

Provided we choose $R_1 \ll R_{TH}$ we get the simplified relation $$I_c = \frac{R_1}{R_{TH}} I_1 \quad (6)$$

Using Equation 1 for $R_{TH}$ and Equation 2 for $I_1$ we get $$I_c = \frac{R_1 C}{A} e^{-(B+\beta)/T} \quad (7)$$

Obviously the exponent in Equation 7 is the sum of $B+\beta$ and hence is larger than either one exponent alone, as is desired. Note that the circuit of FIGURE 14 is still completely independent of fluctuations in the supply voltage in spite of the use of a thermistor. It is judicious to keep device 10 and thermistor 15 of FIGURE 14 at the same temperature, whereas meter 11 can be placed anywhere.

It is evident that device 10 could be replaced by another thermistor, provided $E_0$ is being stabilized. It is evident that the described circuits and devices have wide application in temperature sensing and measuring. Owing to their exponential response with a very large exponent $\beta$ in Equation 2 or $(B+\beta)$ in Equation 7 they lend themselves especially for the triggering of control devices.

As another example of the utility of reverse biased semiconductor junctions, such devices may be used in triggering circuits. A most simple triggering circuit with only one transistor is shown in FIGURE 15. In this figure the emitter electrode of a transistor 20 is connected through a resistance $R_1$, a battery $B_2$ and a variable resistance $R_2$ to the base electrode of the transistor. The base electrode of the transistor is connected through a resistor $R_3$ and the current coil 21 of a sensitive D.C. relay 22 to the collector electrode of the transistor. A battery $B_1$ is connected as shown. Relay 22 has contacts 23 which are adapted to be connected in any suitable circuit to be controlled. It will be noted that the collector-base junction is reverse biased. Suitable selection of the circuit parameters can render this circuit applicable to a sensitive detection of temperature changes.

It should be realized, of course, that any other suitable triggering device having an on state and an off state may be used in place of relay 22, and the device may be either initially on or initially off and subsequently triggered to the other condition.

It is a known fact that transistor circuits, like RF amplifiers etc., are very sensitive to temperature variations. This is due to the fact, that the "reverse current" of the collector junction ($I_{co}$), which is usually reverse biased, is strongly temperature dependent. The effect on the emitter junction, which usually carries forward current, is less pronounced.

The variation of $I_{co}$ with temperature is particularly troublesome in transistor circuits where the change of $I_{co}$ can alter the biasing base current, which, in turn, through the current amplification properties of the transistor, can cause a large change in the output collector current. Ordinary biasing circuit techniques try to eliminate this harmful effect by the proper selection and design of the parameters of the biasing circuit. As exemplary of this reference is made to pages 2, 4 and 5 of "The Lenkurt Demodulator," Vol. 10, No. 9, September 1961. However, this undesirable property of transistor circuits can be used to advantage in our case when the transistor is used as a temperature sensing device. By designing the biasing circuit for temperature instability very large changes in output current can be obtained for small changes in temperature. The principle of such a circuit is that the changes in the "reverse current" ($I_{co}$) of the collector junction influence the bias current of the base, and this change is amplified through the current amplifying properties of the transistor.

A brief approximate theory can be outlined, as follows: The temperature dependence of the "reverse current" of a germanium PN junction is given by $$\ln I_{co} = A - \frac{\beta}{T} \text{ or } I_{co\infty} e^{-\frac{\beta}{T}}$$

where:

$I_{co\infty}$ is the "reverse current" for infinite temperature (imaginary value)

and $T$ is the absolute temperature in ° K.

In the case of a commercial transistor type 2N44, the above constants were found to be: $A = \ln I_{co\infty} = 33$, $\beta = 9000°$ K. With these the variation of $I_{co}$ with $T$ may be written $$\frac{\partial I_{co}}{\partial T} = \frac{\beta I_{co\infty}}{T^2} e^{\frac{\beta}{T}}$$

For $T = 300°$ K. (room temperature)

$$\frac{\partial I_{co}}{\partial T} = 4 \ \mu a./° \text{ K}.$$

For $T = 333°$ K. (60° C.)

$$\frac{\partial I_{co}}{\partial T} = 80 \ \mu a./° \text{ K}.$$

The variation of collector current ($I_c$) with $I_{co}$ is a function of the transistor parameters and the biasing circuit. In the circuit according to FIGURE 15 the current through coil 22 is $I_c = I_{co} + \alpha_b I_e$.

If we define $$S = \frac{\partial I_c}{\partial I_{co}}$$

for the circuit of FIGURE 15 S can be evaluated and is given by $$S = \frac{1/R_1}{1/R_2 + 1/R_3 + \frac{1}{R_1}(1-\alpha_b)}$$

where $\alpha_b$ is the current amplification of the transistor.

S assumes a maximum value for $R_1 = 0$, and we get $$\frac{\partial I_c}{\partial I_{co}} = S \approx \frac{1}{1-\alpha_b}$$

Since $\alpha_b = 0.95$ for transistors generally we get $S=20$. Thus, $$\frac{\partial I_c}{\partial T} = \frac{\partial I_c}{\partial I_{co}} \cdot \frac{\partial I_{co}}{\partial T} = S\frac{\partial I_{co}}{\partial T} = \frac{1}{1-\alpha_b} \frac{\beta I_{co\infty}}{T^2} e^{-\beta/T} \ \mu a./° \text{ K}.$$

With the values for the 2N44 transistor, given above, we get for $T = 300°$ K.     $\frac{\partial I_c}{\partial T} = 80 \ \mu a./° \text{K}.$ $T = 333°$ K.     $\frac{\partial I_c}{\partial T} = 1.6 \ ma./° \text{ K}.$ The sensitivity of a polarized D.C. relay can be easily brought down to the 1–10 $\mu a$. range, thus the sensitivity of the above temperature switch would be ±0.1° K. or ±0.1° C.

The battery $B_2$ together with the variable resistor $R_2$ allows one to adjust $I_c$ and, hence, the triggering point of the circuit and the triggering temperature.

While we have described preferred embodiments of our invention, those skilled in the art will appreciate that various modifications and changes may be made thereto without departing from the spirit and scope of our invention.

What we claim as our invention is:

1. A method for determining the state at any time of a temperature dependent chemical reaction involving a composition of matter and which follows the Arrehenius law $$P_i = \int_{t=0}^{t=t_i} A' e^{-\frac{B}{T(t)}} dt$$

by utilization of the reverse current passing through a semiconductor junction located in a position to sense the temperature of said composition of matter and which follows the law $$I = Ce^{-\frac{\beta}{T}}$$

which comprises; measuring the total electrical charge passing through said semiconductor junction over a time interval $t_1$, said semiconductor junction being reverse biased to a point where the saturation value of reverse current flows through said semiconductor junction, and determining the state of said reaction at time $t_1$ from the known relationship between said charge and said state of said reaction, B and β being equal to each other.

2. A method for determining the state at any time of a temperature dependent chemical reaction involving a composition of matter and which follows the Arrehenius law $$P_i = \int_{t=0}^{t=t} A' e^{-\frac{B}{T(t)}} dt$$

by utilization of the reverse current passing through a semiconductor junction located in a position to sense the temperature of said composition of matter and which follows the law $$I = Ce^{-\frac{\beta}{T}}$$

which comprises; measuring at least a part of the total electrical charge passing through said semiconductor junction over a time interval $t_1$, said semiconductor junction being reverse biased to a point where the saturation value of reverse current flows through said semiconductor junction, and determining the state of said reaction at time $t_1$ from the known relationship between said charge and said state of said reaction, B and β being equal to each other.

3. An analogue circuit for the automatic integration of the Arrhenius equation representing temperature dependent chemical reaction rates which comprises a voltage source, a constant resistor and a semiconductor junction connected in a first series circuit and a temperature sensitive resistor and an electronic current integrator connected in a second series circuit, said second series circuit being in parallel with said first mentioned resistor, said voltage source reverse biasing said semiconductor junction and being of sufficient magnitude to draw the saturation value of the reverse current of said semiconductor junction, said electronic current integrator being adapted to measure the total charge which passes through said second series circuit.

4. A circuit according to claim 3 wherein said temperature sensitive resistor is a thermistor.

5. A circuit according to claim 4 wherein the resistance of said thermistor is substantially greater than the resistance of said first mentioned resistor.

6. A method for determining the age at any time of electrical insulation which is subject to aging by a temperature dependent chemical reaction which follows the Arrhenius law $$P_i = \int_{t=0}^{t=t_i} A' e^{-\frac{B}{T(t)}} dt$$

by utilization of the reverse current passing through a semiconductor junction located in a position to sense the temperature to said electrical insulation and which follows the law $$I = Ce^{-\frac{\beta}{T}}$$

which comprises; measuring at least a part of the total electrical charge passing through said semiconductor junction over a time interval $t_1$, said semiconductor junction being reverse biased to a point where the saturation value of reverse current flows through said semiconductor junction, and determining the age of said insulation at time $t_1$ from the known relationship between said charge and said age, B and β being equal to each other.

No references cited.